United States Patent [19]

Jacobson

[11] 4,205,779
[45] Jun. 3, 1980

[54] PRESSURE BYPASS PORTS FOR AN ULTRACENTRIFUGE DRIVE SYSTEM IN A VACUUM ENVIRONMENT

[75] Inventor: Kenneth E. Jacobson, Fremont, Calif.

[73] Assignee: Beckman Instruments, Inc., Fullerton, Calif.

[21] Appl. No.: 20,386

[22] Filed: Mar. 14, 1979

[51] Int. Cl.² .............................................. B04B 9/02
[52] U.S. Cl. ...................................... 233/24; 233/1 A
[58] Field of Search .................. 233/1 A, 1 R, 13, 24, 233/16, 23 R, 23 A

[56] References Cited

U.S. PATENT DOCUMENTS

| | | |
|---|---|---|
| 1,745,853 | 2/1930 | Krantz . |
| 3,108,955 | 10/1963 | Boyland ............................... 233/24 |
| 3,166,503 | 1/1965 | Thylefor .............................. 233/1 A |
| 3,327,938 | 6/1967 | Stallmann ............................ 233/24 |
| 3,663,077 | 5/1971 | Nakamura . |
| 3,729,128 | 4/1973 | Reed . |
| 3,822,823 | 7/1974 | Wutz ..................................... 233/16 |
| 3,942,716 | 3/1976 | Jacobson ............................. 233/1 A |
| 3,992,183 | 11/1976 | Rough . |
| 4,011,972 | 3/1977 | Pederson ............................. 233/1 A |
| 4,018,304 | 4/1977 | Loloachi . |

Primary Examiner—Robert W. Jenkins
Attorney, Agent, or Firm—R. J. Steinmeyer; F. L. Mehlhoff; William H. May

[57] ABSTRACT

A system of bypass passages adjacent bearing means in the drive system of an ultracentrifuge which operates in a vacuum environment. The bypass passages or channels are designed to prevent the establishment of a pressure differential across the bearings in the drive system when a vacuum is being pulled or exists around the drive system when it is operating. The unique bypass system prevents the loss of lubricating material within the drive system during air evacuation of the drive system and the rotor chamber when a vacuum environment is being established within the rotor chamber. Also, the bypass system promotes a more uniform and constant flow of lubricating medium in the bearings.

7 Claims, 1 Drawing Figure

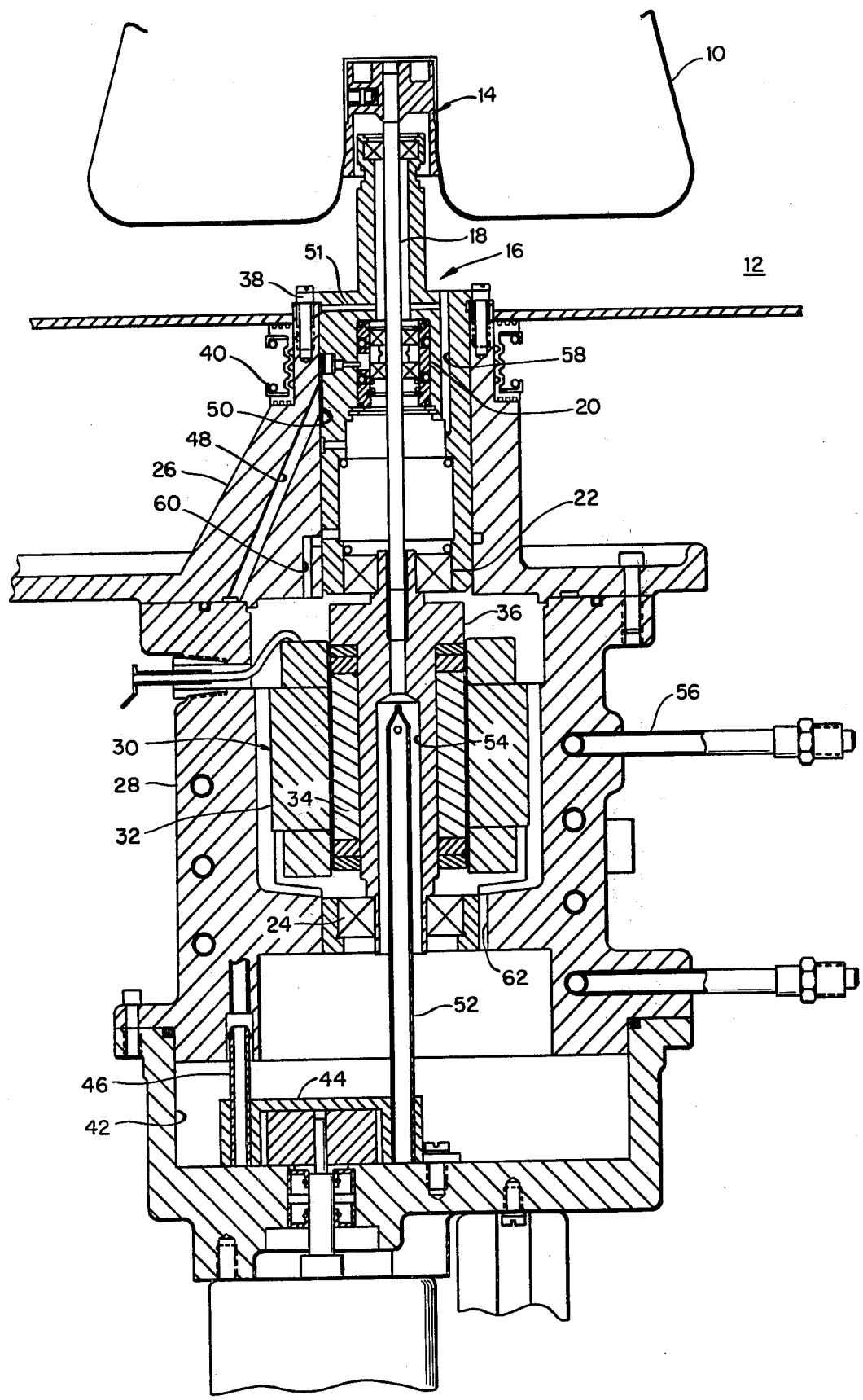

PRESSURE BYPASS PORTS FOR AN ULTRACENTRIFUGE DRIVE SYSTEM IN A VACUUM ENVIRONMENT

BACKGROUND OF THE INVENTION

The present invention is directed to an ultracentrifuge drive system and, more particularly, is directed to a drive system which operates in a vacuum environment wherein pressure bypass ports or channels are utilized to alleviate the potential for a pressure differential being established across the bearings. The bypass ports prevent residual oil in the bearings from being pulled out of the bearings into the vacuum chamber and promote the desirable uniform flow of lubricating oil in the bearings.

In most drive systems for present day ultracentrifuges, the utilization of a gear train is common, since the drive motor does not directly drive the rotor spindle. Also, the entire drive system is generally in a non-vacuum environment. In a high speed ultracentrifuge it is necessary for the rotor chamber to be in a vacuum environment in order to eliminate wind and air friction that might be generated because of the extreme speed at which the ultracentrifuge rotor is spinning. In some cases the speed is as much as 60,000 or 70,000 r.p.m.s. However, in such a system there are many disadvantages with respect to certain features of the drive system which are susceptible to periodic failure. The most common of these is the failure of the vacuum seals which isolate the vacuum chamber from the drive system and are located around the high speed drive spindle which projects from the drive system into the rotor chamber for connection to the rotor. Also, the typical electrical motors used in the gear drive system have motor brushes which are susceptible to wear and must be replaced. Typically, the repair of a drive system in a present day centrifuge requires a significant amount of time and effort, because the entire drive system must be removed for repair. This system includes the drive motor as well as all of the drive gears, chain and spindle arrangement.

One approach to eliminate a significant amount of maintenance problems with respect to a high speed ultracentrifuge drive system is using a direct drive system as explained in my copending patent application entitled A Direct Drive High Speed Ultracentrifuge. In that system a removable spindle is placed within the drive system housing and is easily removed as a unit with all the high speed bearings from within the rotor chamber to permit easy and efficient maintenance of the machine. One direct drive system utilizes an electrical induction motor wherein the armature is connected to the drive spindle to provide the direct driving force on the spindle. A stator is housed within the drive housing and is designed to receive the motor armature on the drive spindle when the spindle assembly is placed within the drive housing. An arrangement of this type of drive system can eliminate the need for any vacuum seals between the drive system and the rotor chamber on the drive spindle, because the drive system is housed in a vacuum environment. Therefore, when a drive spindle is replaced because of a possible bearing failure, there is no need to disturb any vacuum seals for its removal and replacement. The elimination of vacuum seals around the high speed spindle removes a source of continual potential maintenance problems.

Also included in the direct drive assembly as set forth in my copending patent application entitled Lubrication and Cooling System for a High Speed Ultracentrifuge Drive Assembly is a lubricating system which introduces a controlled amount of lubricating medium such as oil to the high speed bearings which are in the drive spindle assembly. After each centrifugation run there is some residual lubricating oil left in the bearings. For each subsequent centrifugation run a vacuum environment must be reestablished in the rotor chamber. Since the drive assembly within its housing is in environmental communication with the rotor chamber, the drive assembly is also subjected to the vacuum. However, as the vacuum is being established through the rotor chamber and the drive spindle assembly, some of the oil may be pulled out of the bearings and into the vacuum chamber of the rotor. This not only presents a cleanliness problem with respect to the rotor chamber, but also results over a period of time in the loss of the lubricating oil for the bearings, because the oil operates in a self contained system within the drive housing. The main reason the oil is pulled into the rotor chamber is, when the vacuum is being pulled, the bearings with a residual lubricating oil tend to act like a seal. If the pressure differential becomes great enough across the bearing the oil may be blown out of the bearing.

Also, during the operation of the drive spindle even though the vacuum has been established in the rotor chamber, a slight pressure differential tray develop across the bearings and tend to cause the bearings to act somewhat like a seal. This may promote erratic flow of oil through the bearings and affect the life of the bearings.

SUMMARY OF THE INVENTION

The present invention is directed to a system of bypass ports or channels which are established in the drive housing of a direct drive spindle assembly for a high speed ultracentrifuge. These bypass ports are established around the bearing areas which otherwise would be subjected to a pressure differential when a vacuum is pulled on the system. By eliminating the potential for a pressure differential across the bearings, the possibility of the bearings acting as a seal with the lubricating oil is alleviated to prevent not only erratic flow of oil in the bearing, but also the blow through of oil which may flow into and contaminate the rotor chamber.

These bypass channels or passages are adjacent each of the bearings, so that, as a vacuum is being generated on the rotor chamber and drawn through the drive spindle assembly the air will flow around the bearings through these bypass passages rather than through the bearings themselves. Also, while the rotor and spindle assembly are operating there is some leakage through the drive system of air and, therefore, this air will be drawn through the bypass channels rather than through the bearings which would tend to cause the periodic activation of the bearings as a seal which may promote erratic flow of oil that would be detrimental to the life of the high speed bearings.

The prevention of oil being pulled out of the bearings and up into the rotor chamber during the evacuation of the air, as a vacuum is being pulled on the rotor chamber, will eliminate the depletion of the lubricating oil within the drive assembly. By eliminating the potential loss of oil from the lubricating system which is self contained within the housing of the drive assembly, there is no requirement for an external indicator oil level. The use of the bypass passages eliminates any potential loss and, therefore, the system will maintain a constant level of oil.

Also, the oil, if pulled into the rotor chamber would cause possible contamination of the chamber optical system which is necessary to monitor the operation of the rotor.

BRIEF DESCRIPTION OF THE DRAWING

The FIGURE is a vertical sectional view of the overall drive system in a high speed ultracentrifuge.

DETAILED DESCRIPTION OF THE INVENTION

Reference is made to the FIGURE showing a rotor 10 mounted in a rotor chamber 12 on the hub assembly 14 of a drive spindle assembly 16. The drive spindle assembly 16 comprises the drive spindle 18 on which are located a damper bearing assembly 20 and upper high speed bearing 22 and a lower high speed bearing 24. The spindle assembly 16 is placed within drive mount plate housing 26 and a stator motor housing 28. An induction motor 30 has a stator 32 within the housing 28 and an armature 34 which is secured to the armature shaft 36 connected to the spindle 18.

As explained in my copending patent application entitled A Direct Drive High Speed Ultracentrifuge, the removal of the bolts or screws 38 on the drive spindle assembly 16 permits the removal of the entire drive spindle assembly 16 including the drive spindle 18, the damper bearings 20, high speed bearings 22 and 24 as well as the induction motor armature 34. This provides for more convenient and efficient maintenance of the drive spindle assembly which can be removed through the rotor chamber 12 and out of the ultracentrifuge. The vacuum seal 40 is designed to seal the rotor chamber 12 from the non-vacuum environment. The entire interior area of the induction motor housing 28 and the drive mount plate housing 26 is designed to be subjected to a vacuum environment when the rotor chamber 12 receives a vacuum environment.

A complete lubricating system is self contained within the motor housing 28 and drive mount plate housing 26. Reference is made to my copending application entitled A Lubrication and Cooling System For a High Speed Ultracentrifuge Drive Assembly for a more detailed explanation of the lubricating and cooling system for the present direct drive system. Briefly, the oil from the reservoir 42 is pumped by the pump assembly 44 through the bearing lubricating conduit 46 up through the inclined passage 48 to the annulus 50 from which oil propagates to the supply port 51 to enter the damper bearing assembly 20 and proceeds down into the upper high speed bearing 22 and eventually to the lower high speed bearing 24. Also, there is a central cooling feed tube 52 which provides oil into a central cavity 54 within the armature shaft 36 and armature 34 to provide cooling to the armature as explained in my previously referenced copending application entitled A Lubrication and Cooling System For a High Speed Ultracentrifuge Drive Assembly. The overall induction motor housing 28 is cooled by a heat transfer medium passing through the coil 56.

Once a rotor 10 has been placed on the hub assembly 14 in the rotor chamber 12 and is ready for the initiation of rotation for extremely high speed ultracentrifugation of approximately 80,000 r.p.m.s, it is necessary that the rotor chamber 12 be a vacuum environment so that wind or air friction is eliminated with respect to the spinning of the rotor. Since there are no vacuum seals on the drive spindle 18, the entire drive spindle assembly and induction motor 30 is subjected to a vacuum environment when it is drawn on the rotor chamber 12. After each centrifugation run of the rotor, some residual oil will remain within the bearings of the drive assembly. Consequently, some of the oil, when the vacuum is pulled on the vacuum chamber and through the drive system, may react with the bearing to form a seal within the bearings and result in some of the oil being eventually pulled or blown out of the bearings and into the rotor chamber. As stated previously, this is undesirable because it contaminates the rotor chamber, especially with respect to any optical instrumentation utilized to monitor the rotor operation. During the operation of the ultracentrifuge, a pressure differential may might develop across the bearings because there usually a leakage of some air into the drive system. This pressure differential would cause possible erratic flow of the oil into the bearings and result in a pressure buildup when the bearing attempts to act as a seal until the pressure differential is too great and the air is released, causing the erratic operation of the bearings.

In the present invention a bypass channel 58 is established around the damper bearing assembly 20. Also, a bypass passage 60 is established around the upper high speed bearing 22 and a bypass channel 62 is established around the lower high speed bearing 24. The utilization of this system of bypass ports or channels around the bearings in the spindle drive assembly eliminates the establishment of a pressure differential across the bearings and, therefore, promotes a more uniform oil flow for lubrication to eliminate the potential for the drawing of oil out of the bearings and into the rotor chamber 12. When a vacuum is drawn on the rotor chamber as well as the drive spindle assembly, the air will primarily be drawn out through the bypass passages 58, 60 and 62. Also, during the operation of the rotor when some air is leaking through the drive system which would be pulled up through the drive system by the continued establishment of the vacuum environment in the rotor chamber 12. The flow of the air which tends to leak into the system during operation would primarily be directed through the bypass passages 58, 60 and 62 to prevent any possible cyclic buildup of pressure across the bearings which causes erratic lubrication.

Although passages 58, 60 and 62 are shown in a somewhat straightforward manner around the respective damper bearing 20, upper high speed bearing 22 and lower high speed bearing 24, it is envisioned that other channel or routing means around the bearings could be accomplished and still achieve the idea of providing an alternate passage of air around the bearings. This would avoid air passage through the bearings by the establishment of a vacuum in the rotor chamber as well as by the continued somewhat small flow of leakage air through the system.

What is claimed is:

1. A drive system for a high speed ultracentrifuge comprising:
   a drive spindle mounted below the rotor chamber of said ultracentrifuge, said chamber being subjected to a vacuum environment when said ultracentrifuge is operating;
   a plurality of bearing means located along said drive spindle;
   means for directly driving said drive spindle, said drive spindle with said bearing means and said driving means being in a vacuum environment during operation of said ultracentrifuge;

means for lubricating said bearing means with a lubricating medium; and means for preventing said lubricating medium from being pulled from said bearing means into said rotor chamber as said chamber is being evacuated to establish a vacuum environment.

2. A drive system as defined in claim 1, wherein said preventing means comprises a bypass port around each of said plurality of bearing means, so that air can flow around each of said bearing means without going through each of said bearing means.

3. A drive system for a high speed ultracentrifuge comprising:

a drive spindle mounted below a rotor chamber of said ultracentrifuge, said chamber having a vacuum environment when said ultracentrifuge is operating;

damper bearing means located on the upper end of said drive spindle;

means for lubricating said damper bearing means with a lubricating medium;

means for driving said drive spindle, said chamber and said drive spindle with said damper bearing means being in environmental communication with each other so that said vacuum in said chamber during said ultracentrifuge operation is also imposed on said drive spindle and said damper bearing means; and means adjacent said damper bearing for preventing a pressure differential being established across said damper bearing and for maintaining a constant flow of said lubricating medium in said damper bearing.

4. A drive system as defined in claim 3, and additionally comprising at least one high speed bearing mounted on said drive spindle; and means adjacent said high speed bearing for allowing air to pass from one side to the other side of said high speed bearing without passing completely through said high speed bearing, so that no pressure differential will develop between said sides of said high speed bearing.

5. A drive system as defined in claim 3, wherein said preventing and maintaining means comprises a bypass passage to establish an air channel around said high speed bearing so that air will not flow through said bearing when said vacuum environment is being established in said rotor chamber.

6. A drive system for a high speed ultracentrifuge comprising:

a housing located below a rotor chamber in said ultracentrifuge;

a drive spindle mounted within said housing, said rotor chamber and said housing containing said drive spindle having a vacuum environment when said ultracentrifuge is operating;

bearing means on said drive spindle; and means within said housing adjacent said bearing means for venting air flow around said bearing means to prevent a pressure differential across said bearing means as air is evacuated from said chamber and said housing to establish said vacuum environment.

7. A high speed ultracentrifuge comprising:

a rotor chamber for receipt of a rotor, said chamber operating in a vacuum environment;

a drive housing mounted adjacent said rotor chamber;

a drive assembly mounted in said housing, said drive assembly operating in a vacuum environment within said housing;

a drive spindle within said drive assembly;

at least one bearing on said spindle;

a lubricating medium for lubricating said bearing; and at least one bypass channel adjacent said bearing, said bypass channel providing an alternate flow path for the air within said drive housing when said vacuum environment is being established within said rotor chamber and said housing so that said bearing does not create a seal with said lubricating medium and establish a pressure differential across said bearing causing sporadic introduction of said lubricating medium into said chamber and erratic flow of said lubricating medium in said bearing.

* * * * *